United States Patent
Hagerott et al.

(10) Patent No.: US 10,976,751 B1
(45) Date of Patent: Apr. 13, 2021

(54) OSCILLATORY MONITOR

(71) Applicant: Textron Aviation Inc., Wichita, KS (US)

(72) Inventors: Steven G. Hagerott, Wichita, KS (US); Russell Peters, Colorado Springs, CO (US); Stephen M. Eddy, Derby, KS (US)

(73) Assignee: Textron Innovations, Inc., Providence, RI (US)

( * ) Notice: Subject to any disclaimer, the term of this patent is extended or adjusted under 35 U.S.C. 154(b) by 462 days.

(21) Appl. No.: 15/828,795

(22) Filed: Dec. 1, 2017

Related U.S. Application Data

(60) Provisional application No. 62/429,180, filed on Dec. 2, 2016.

(51) Int. Cl.
| | |
|---|---|
| *G05D 1/08* | (2006.01) |
| *G05D 1/10* | (2006.01) |
| *G05B 23/02* | (2006.01) |
| *B64C 13/16* | (2006.01) |
| *G05D 1/00* | (2006.01) |

(52) U.S. Cl.
CPC ........... *G05D 1/0825* (2013.01); *B64C 13/16* (2013.01); *G05B 23/0208* (2013.01); *G05B 23/0291* (2013.01); *G05D 1/0055* (2013.01); *G05D 1/101* (2013.01)

(58) Field of Classification Search
None
See application file for complete search history.

(56) References Cited

U.S. PATENT DOCUMENTS

| | | | | |
|---|---|---|---|---|
| 4,826,110 A | * | 5/1989 | Le | G05D 1/0055 244/194 |
| 5,719,566 A | * | 2/1998 | Readman | B64D 45/0005 244/178 |
| 7,822,493 B2 | | 10/2010 | Mossman et al. | |
| 8,190,309 B2 | | 5/2012 | Boe et al. | |
| 9,274,523 B2 | | 3/2016 | Giesseler | |

(Continued)

OTHER PUBLICATIONS

Zolghadri, Signal and model-based fault detection for aircraft systems, 2015, IFAC (Year: 2015).*

(Continued)

*Primary Examiner* — David P. Merlino
(74) *Attorney, Agent, or Firm* — Erise IP, P.A.

(57) ABSTRACT

A method for monitoring an oscillatory signal from an oscillating device includes filtering the oscillatory signal to within a desired frequency band to provide a filtered signal and extracting an amplitude from the filtered signal. The method further includes switching control of the oscillating device when the amplitude exceeds a predetermined amplitude requirement for a predetermined duration. An oscillatory signal monitor includes a first controller and a second controller each configured to independently control an oscillating device. An oscillatory signal based on a position of the oscillating device is filtered to a desired frequency band, and an amplitude is extracted from the filtered signal. A switch is provided for switching control of the oscillatory device from the first controller to the second controller when the amplitude exceeds a predetermined amplitude requirement for a predetermined duration.

15 Claims, 7 Drawing Sheets

(56) References Cited

U.S. PATENT DOCUMENTS

| 9,658,627 | B2* | 5/2017 | Englund | G05D 19/02 |
| 2009/0048689 | A1* | 2/2009 | Pelton | G05B 23/0235 |
| | | | | 700/33 |
| 2013/0325254 | A1* | 12/2013 | Goupil | B64F 5/60 |
| | | | | 701/33.9 |
| 2014/0372078 | A1* | 12/2014 | Gheorghe | G01M 17/00 |
| | | | | 702/183 |
| 2017/0158348 | A1* | 6/2017 | Teubner | G05B 23/0235 |

OTHER PUBLICATIONS

Zolghadri, Fault Diagnosis and Fault-Tolerant Control and Guidance for Aerospace Vehicles, 2014, Springer (Year: 2014).*
Efimov, Actuator fault detection in aircraft systems, May 2013, Annual Reviews in Control (Year: 2013).*
Goupil, Oscillatory failure case detection in the A380, 2010, Control Engineering Practice (Year: 2010).*
Sachs, Monitoring of Oscillatory Failure Cases, 2008, 26th International Congress of the Aeronautical Sciences (Year: 2008).*
Berdjag, Fault Diagnosis and monitoring of oscillatory failure case in aircraft inertial system, Sep. 2012, Control Engineering Practice (Year: 2012).*

* cited by examiner

US 10,976,751 B1

OSCILLATORY MONITOR

CROSS-REFERENCE TO RELATED APPLICATIONS

This application claims the benefit of U.S. Provisional Patent Application Ser. No. 62/429,180 entitled Oscillatory Monitor and filed Dec. 2, 2016, the disclosure of which is herein incorporated by reference in its entirety.

BACKGROUND

1. Field of the Disclosure

Embodiments of this disclosure relate generally to control systems and methods, and more specifically to control systems and methods for oscillatory devices.

2. Description of the Related Art

U.S. Pat. No. 9,274,523 to Giesseler discloses a method for reducing yawing motions of an aircraft by reducing side slipping oscillations or unfavorable yaw oscillations of the aircraft. Giesseler further discloses reducing yawing motions by actuating a spoiler in a mutually opposite direction of a regulating flap on the same airfoil.

SUMMARY

In an embodiment, a method for monitoring an oscillatory signal is provided. The method includes providing an oscillatory signal from an oscillating device, filtering the oscillatory signal to within a desired frequency band to provide a filtered signal, and extracting an amplitude from the filtered signal. The method further includes determining whether the amplitude exceeds a predetermined amplitude requirement for a predetermined duration and switching control of the oscillating device from a first controller to a second controller when the amplitude exceeds the predetermined amplitude requirement for the predetermined duration.

In another embodiment, an oscillatory signal monitor is provided. The oscillatory signal monitor includes a first controller and a second controller each configured to independently provide control of an oscillating device and an oscillatory signal based on a position of the oscillating device. The oscillatory signal monitor further includes a processor for processing software stored in non-transitory memory, the software providing instructions for performing the steps of filtering the oscillatory signal to a desired frequency band to provide a filtered signal, extracting an amplitude from the filtered signal, and determining whether the amplitude exceeds a predetermined amplitude requirement for a predetermined duration. The oscillatory signal monitor further includes a switch for switching control of the oscillatory device from the first controller to the second controller when the amplitude exceeds the predetermined amplitude requirement for the predetermined duration.

In yet another embodiment, a method for monitoring oscillatory signals is provided. The method includes providing a first oscillatory signal and a second oscillatory signal, determining a difference between the first oscillatory signal and the second oscillatory signal to provide a difference signal, and filtering the difference signal to within a desired frequency band to provide a filtered signal. The method further includes extracting an amplitude from the filtered signal and determining whether the amplitude exceeds a predetermined amplitude requirement over a predetermined duration.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Unintended deflections of aircraft control surfaces may lead to undesirable aircraft movement, including potentially catastrophic loss of control of the aircraft. To prevent loss of control of the aircraft, control surface position may be monitored with one or more sensors. When deflection of a control surface deviates beyond a predetermined requirement, an unintended deflection may be identified and mitigated by for example switching to a redundant controller.

Some control surfaces may intentionally oscillate making detection of unintended deflections more challenging. A control surface position may oscillate with a frequency of about 0.1 Hz to about 50 Hz for example. Additionally, the magnitude of an acceptable deflection may depend on the frequency at which the control surface oscillates such that at lower frequencies larger deflections are permitted, while at higher frequencies only smaller deflections are permitted (see e.g., FIG. 5 described below). The magnitude of an acceptable deflection may further depend on the speed of the aircraft such that at lower speeds larger deflections are permitted, while at higher speeds only smaller deflections are permitted, due to aerodynamic forces on the control surface. In some embodiments, an actual position of the control surface may be measured and compared to a predetermined limit as a function of oscillatory frequency. In certain other embodiments, the actual control surface position is compared to an expected position based on a model of the control system. Any difference between the actual position and the predetermined limit or the expected position may be considered an unintended deflection. If the unintended deflection persists for a predetermined period of time, the oscillatory monitor may instruct a redundant controller to take over control of the control surface. In certain other embodiments, redundant oscillatory signals are compared such that faulty signals may be identified and deactivated.

Figure 1:
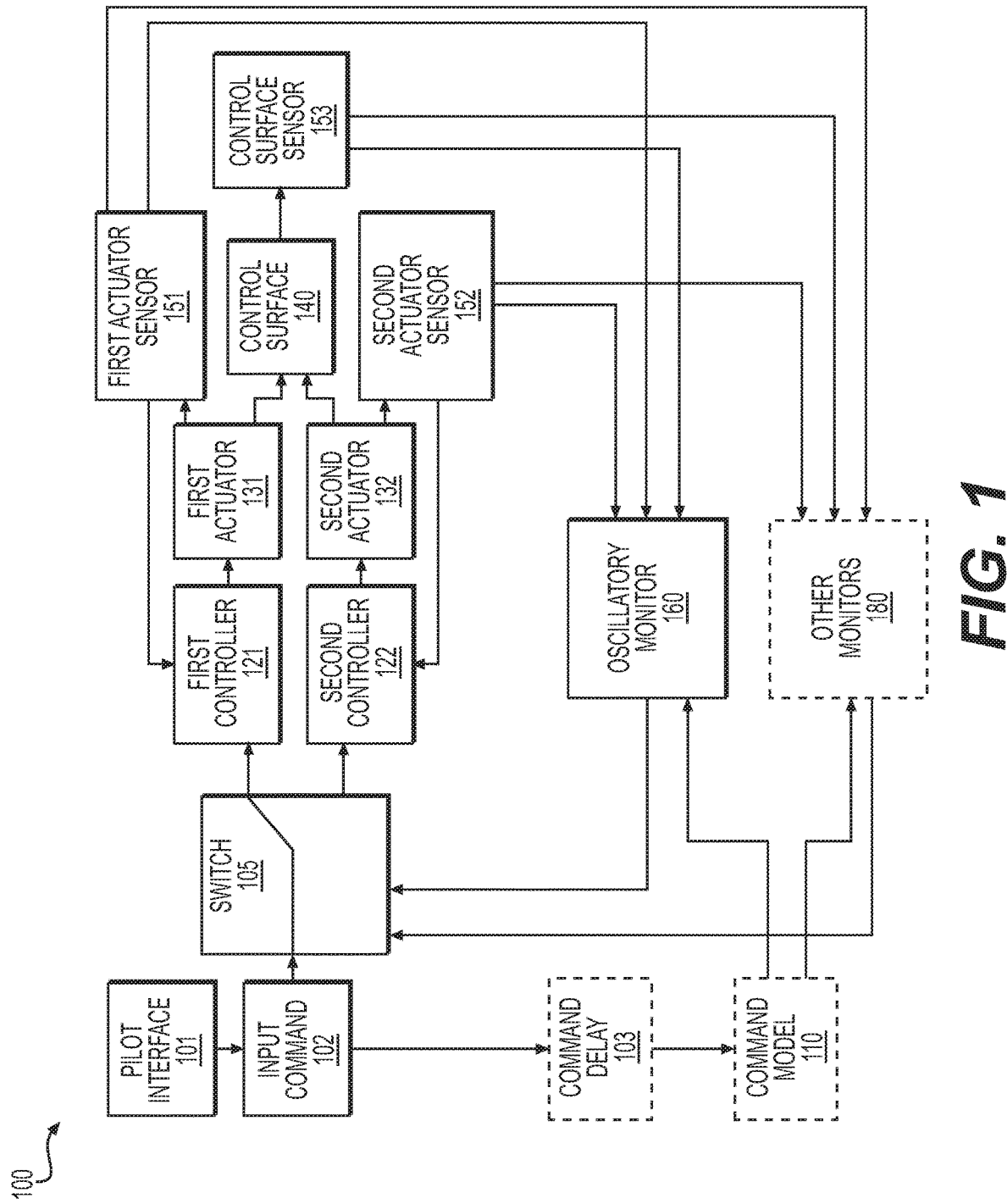
FIG. 1 is a block diagram of an oscillatory monitoring system, in an embodiment.

FIG. 1 is a block diagram of an exemplary system 100 for use with an oscillatory monitor 160. Arrows connecting blocks of the diagram indicate signal pathways, which may include redundant signal pathways (e.g., duplicate or triplicate independent signal pathways).

System 100 includes a pilot interface 101, which is for example a yoke, center stick, or side stick. A pilot provides an input command 102 using pilot interface 101 for altering motion of an aircraft via one or more control surfaces, such as a control surface 140. Control surface 140 is an example of any device that oscillates. In the context of aircraft, examples of control surface 140 include an aileron, elevator, horizontal stabilizer, flap, slat, spoiler, or rudder. Input command 102 electronically couples pilot interface 101 to either a first controller 121 or a second controller 122 via switch 105. First and second controller 121, 122 are configured to control a first actuator 131 or a second actuator 132, respectively. First and second actuator 131, 132 are in turn configured to move control surface 140, as described below.

First controller 121 and first actuator 131 are paired together and may be redundant with second controller 122 and second actuator 132, which are likewise paired together. In the event of an unintended deflection of control surface 140, switch 105 enables changing the controller/actuator pair from for example first controller 121 and first actuator 131, to second controller 122 and second actuator 132, or vice versa. In this manner, a faulty actuator is avoided and the backup actuator takes over control of control surface 140, thus correcting an unintended deflection and mitigating potentially catastrophic loss of control of the aircraft. In an embodiment, switch 105 may change control of control surface 140 to a third controller/actuator pair or to a completely redundant control system.

In order for switching between controller/actuator pairs via switch 105 to effectively correct unintended deflections of control surface 140, rapid detection of the unintended deflection or hardover event is necessary. Unintended deflections may be detected using a sensor such as a control surface sensor 153 that provides position information related to control surface 140. The position information provided by control surface sensor 153 may include measured values such as a deflection angle of control surface 140 or a hinge angle for a hinge mechanically coupled to control surface 140. An amount of time needed to detect an unintended deflection depends on the rate at which first and second actuator 131, 132 operate and oscillate, which may in turn depend on the aircraft's airspeed due to aerodynamic forces on control surface 140.

Figure 2:
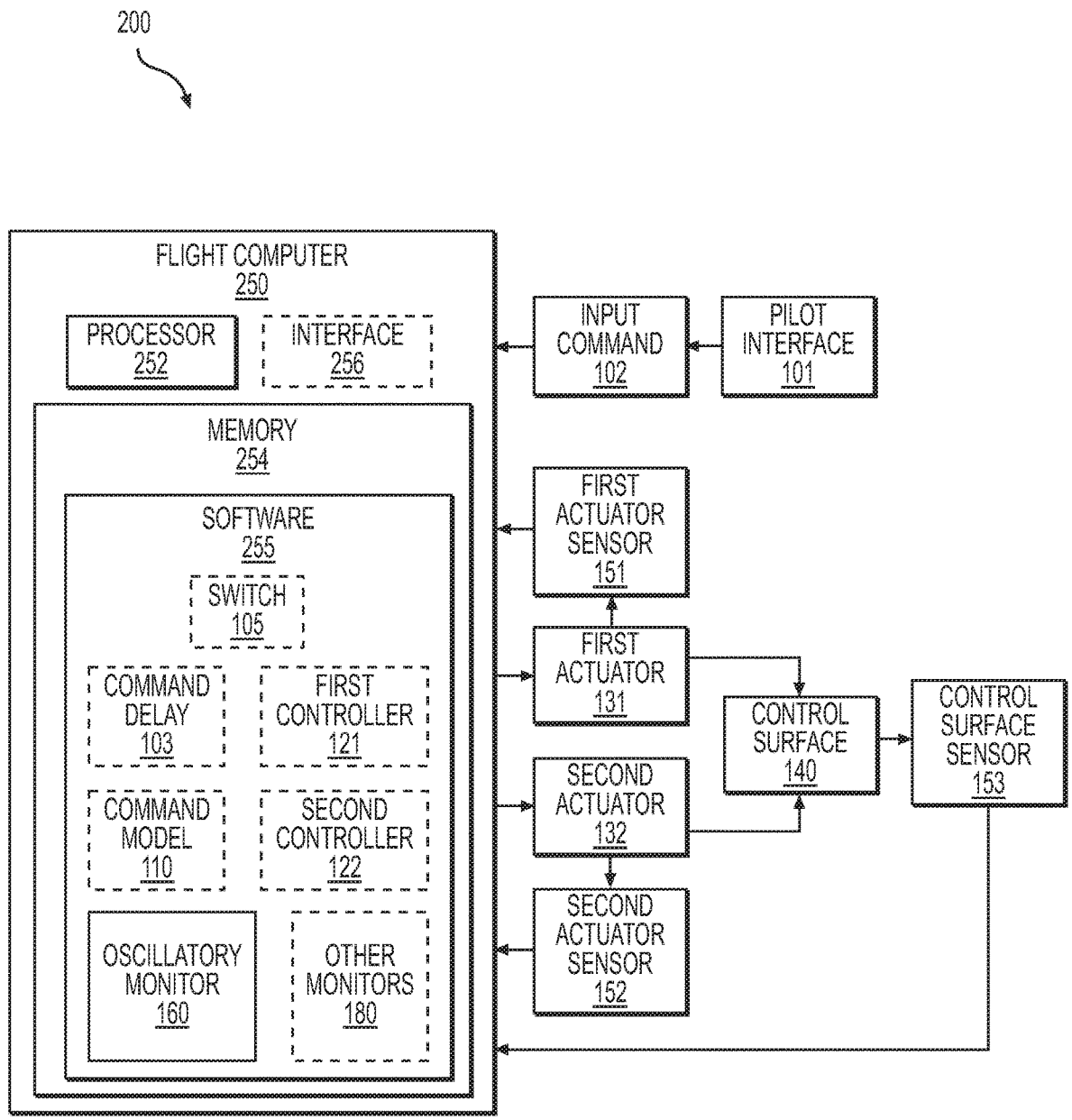
FIG. 2 is a block diagram of a flight computer and communications architecture for performing functions of the system of FIG. 1, in an embodiment.

First and second controller 121, 122 include control algorithms executed by for example a flight computer onboard the aircraft, such as flight computer 250, FIG. 2. First and second controller 121, 122 may include a feedback mechanism having a weighted sum of one or more of a proportional term, an integral term, and a derivative term. The feedback mechanism depends on a difference or error term, $\varepsilon$, between input command 102 and an actuator response, either from first or second actuator 131, 132 depending on which actuator is activated as determined via switch 105. The response of first or second actuator 131, 132 is determined using one or more sensors for each actuator, such as a first actuator sensor 151 configured to determine a response of first actuator 131. Likewise, a second actuator sensor 152 is configured to determine a response of second actuator 132. Determining a response via first or second actuator sensor 151, 152 may include for example determining an instantaneous position or an oscillatory rate of response.

First and second controller 121, 122 may include any type of suitable controller, including analog or digital, for controlling first and second actuator 131, 132, respectively. In an embodiment, first and second controller 121, 122 are proportional-integral-derivative controllers in which the proportional term adjusts input command 102 in proportion to the magnitude of $\varepsilon$, the integral term adjusts input command 102 in proportion to both the magnitude and the duration of $\varepsilon$ by integrating over time to account for any cumulative $\varepsilon$, and the derivative term adjusts input command 102 in proportion to the rate of change of $\varepsilon$ over time. The terms are weighted based on gains (e.g., coefficients), which may be tuned to provide a stable input command 102 with a minimal $\varepsilon$ to either first or second actuator 131, 132. In another embodiment, first and second controller 121, 122 are each a proportional-integral controller in which the derivative term is not used (e.g., set to zero). In certain embodiments, actuator valve position feedback may be used as a surrogate for rate feedback (e.g., derivative controller action).

First and second controller 121, 122 reduce $\varepsilon$ based on feedback from first and second actuator sensor 151, 152, respectively, which may be used to improve performance of control surface 140 in addition to avoiding unintended deflection of control surface 140.

First and second actuator 131, 132 may include any type of suitable actuator for providing deflection of control surface 140, such as hydraulic, pneumatic, electric or mechanical for example. Depending on the type of control surface 140 to be actuated (e.g., aileron, elevator, horizontal stabilizer, flap, slat, spoiler, or rudder), different types of actuators may be preferentially employed. In an embodiment, first and second actuator 131, 132 include an electro-hydraulic servo valve (EHSV) in which a servo valve electrically controls hydraulic fluid for transferring power to provide deflection of control surface 140. The EHSV position information may be provided via first and second actuator sensor 151, 152 and fed back to first and second controller 121, 122, respectively, and used to drive the rate at which first and second actuator 131, 132 move via a closed loop response based on $\varepsilon$. The closed loop response may approximate a first order lag.

First and second actuator 131, 132 may be operated at a predetermined rate, which may in turn depend on the aircraft's airspeed due to aerodynamic forces on control surface 140. While taxiing on the ground, the full rate range may be used, whereas during high speed flight the rate may be limited to a predetermined rate to avoid unsafe aerodynamic loads on control surface 140.

Oscillatory monitor 160 may receive a position signal from control surface sensor 153 providing position information related to control surface 140. Oscillatory monitor 160 may also receive a position signal from first actuator sensor 151 and/or second actuator sensor 152, which provide position information related to first actuator 131 and second actuator 132, respectively. The position signal may include a real-time measurement or value related to position, such as a deflection angle or hinge angle for example.

In addition to oscillatory monitor 160, unintended deflections of control surface 140 may optionally be detected using other types of monitors, represented in FIG. 1 by other monitors 180. Other monitors 180 may also receive position information from first actuator sensor 151, second actuator sensor 152, and control surface sensor 153 similar to oscillatory monitor 160. Any other type of control surface monitor may be included in other monitors 180, such as a position limit monitor, or a disconnect monitor configured to observe a discord between position of control surface 140 and position of first actuator 131 for example. Other monitors 180 may operate in parallel with oscillatory monitor 160 to provide redundancy and to meet dissimilarity requirements. For example, at low frequency oscillations, a position limit monitor may be used to identify an oscillatory failure because the position differs from an expected position with enough time to identify the difference (e.g., within a first oscillation). Additionally, signal monitors may be included in other monitors 180 to detect a faulty signal. For example, a command signal may be provided in triplicate and one of the triplicate signals may be identified as faulty and deactivated (see description in connection with FIG. 7, below).

A command delay 103 is optionally provided for delaying input command 102 by a time lag to synchronize control surface 140 and an optional command model 110. Input command 102 is for example a command provided by a pilot using pilot interface 101 for altering aircraft motion via one or more control surfaces such as control surface 140. Command model 110 is for example a control model of system 100 that computes expected position information for first actuator 131, second actuator 132, and control surface 140 based on their physical properties, input command 102, and control laws that govern first and second controller 121, 122. The expected position information generated using command model 110 may be used by oscillatory monitor 160 or other monitors 180 to compare with measured position information from control surface sensor 153 or first and second actuator sensor 151, 152, as further described below in connection with FIG. 5. Command delay 103 and command model 110 may be stored and executed using a flight computer as described below in connection with FIG. 2. In an embodiment, command delay 103 is an integer number corresponding to computational cycles of command model 110. The integer number is tunable and may depend for example on aircraft airspeed.

FIG. 2 is a block diagram of an exemplary flight computer and communications architecture 200. Architecture 200 includes a flight computer 250, which is for example a computer onboard the aircraft having a memory 254, including a non-transitory medium for storing software 255, and a processor 252 for executing instructions of software 255. Software 255 includes oscillatory monitor 160 and optionally switch 105, command delay 103, command model 110, first controller 121, second controller 122, and other monitors 180, which provide instructions stored in memory 254 that are executable by processor 252. Switch 105, first controller 121, and second controller 122 are optionally included in software 255, or alternatively they are located in communication with, but separate from, flight computer 250. For example, switch 105 may be an electrical switch, and first and second controller 121, 122 may include a microcontroller, microprocessor, or programmable logic controller (PLC). Flight computer 250 may further include an optional interface 256 for a pilot or co-pilot to transmit instructions and receive information. Communication between air data computer 250 and external subsystems shown in FIG. 2 may be by one of a wired and/or wireless communication media.

In an embodiment, architecture 200 includes two separate flight computers, one for each controller/actuator pair, to provide further redundancy. For example, architecture 200 may have a first flight computer in communication with first controller 121 and first actuator 131 and a second flight computer in communication with second controller 122 and second actuator 132. In yet another embodiment, architecture 300 includes three controller/actuator pairs to provide additional redundancy.

Figure 3:
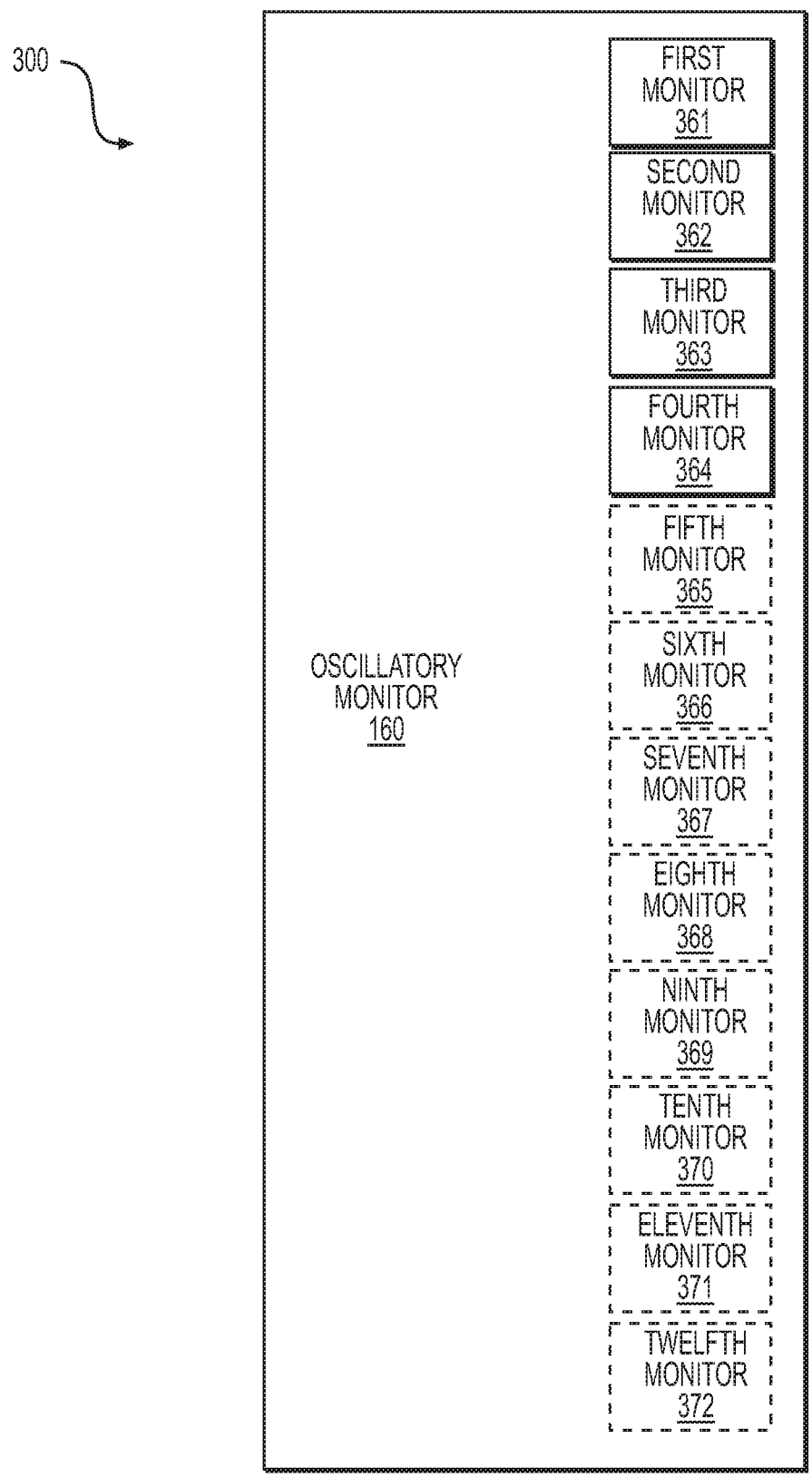
FIG. 3 is a block diagram of an exemplary oscillatory monitor, in an embodiment.

FIG. 3 shows oscillatory monitor 160 in further exemplary detail. Because position of control surface 140 may be a function of oscillatory frequency, distinguishing between a permissible deflection and an unintended deflection often requires determining both the position and frequency of the control surface. Accordingly, oscillatory monitor 160 may include a plurality of individual monitors each configured for monitoring a different frequency band of a signal, such as the signal from control surface sensor 153 that provides position information about control surface 140.

Oscillatory monitor 160 may filter the position signal into a plurality of frequency bands, each of which is monitored by an individual oscillatory monitor such as first monitor 361, second monitor 362, and so on. The process of filtering the position signal into a plurality of frequency bands is described below in connection with FIG. 4. As shown in FIG. 3, oscillatory monitor 160 includes a first monitor 361, a second monitor 362, a third monitor 363, and a fourth monitor 364. In certain embodiments, first monitor 361 is configured for monitoring the 1-2 Hz frequency band; second monitor 362 is configured for monitoring the 2-4 Hz frequency band; third monitor 363 is configured for monitoring the 4-8 Hz frequency band; and fourth monitor 364 is configured for monitoring the 8-12 Hz frequency band (see e.g., FIG. 5). In operation, the frequency bands may overlap because attenuation may be gradual outside of each desired band. As a result of tuning each individual monitor, the actual frequency bands may differ from the intended frequency bands, but continuous oscillatory monitor coverage is still provided due to overlap from a neighboring frequency band.

In certain embodiments, oscillatory monitor may be configured with additional optional monitors to either expand the frequency range monitored (e.g., <1 Hz and/or >12 Hz) or provide narrower frequency bands (e.g., 0.5 Hz or 1 Hz bands). For example, oscillatory monitor 160 is depicted in FIG. 3 having eight additional optional monitors, namely fifth, sixth, seventh, eighth, ninth, tenth, eleventh, and twelfth monitors 365, 366, 367, 368, 369, 370, 371, and 372, respectively. Advantages of using more than four monitors include expanded coverage of low or high frequency oscillations and/or providing narrower frequency bands, which may reduce false positive trips due to corresponding narrower ranges of permissible position amplitudes. Disadvantages of using more than four monitors include additional effort to tune the bandpass filters. The number of monitors in oscillatory monitor 160 may be configured for a particular type of control surface. Oscillatory monitor 160 may be configured with fewer than four monitors or greater than twelve monitors without departing from the scope hereof.

In an embodiment, control surface sensor 153, FIG. 1 provides a position signal that may include signal noise such that a brief exceedance of oscillatory monitor 160 due to signal noise would cause unacceptably frequent false positive trips. Accordingly, one or more signal filters may be employed to remove signal noise and one or more checks may be performed to determine if an exceedance of oscillatory monitor 160 persists for an extended duration, the length of which may be adjusted in connection with the extent of exceedance, as described below.

Figure 4:
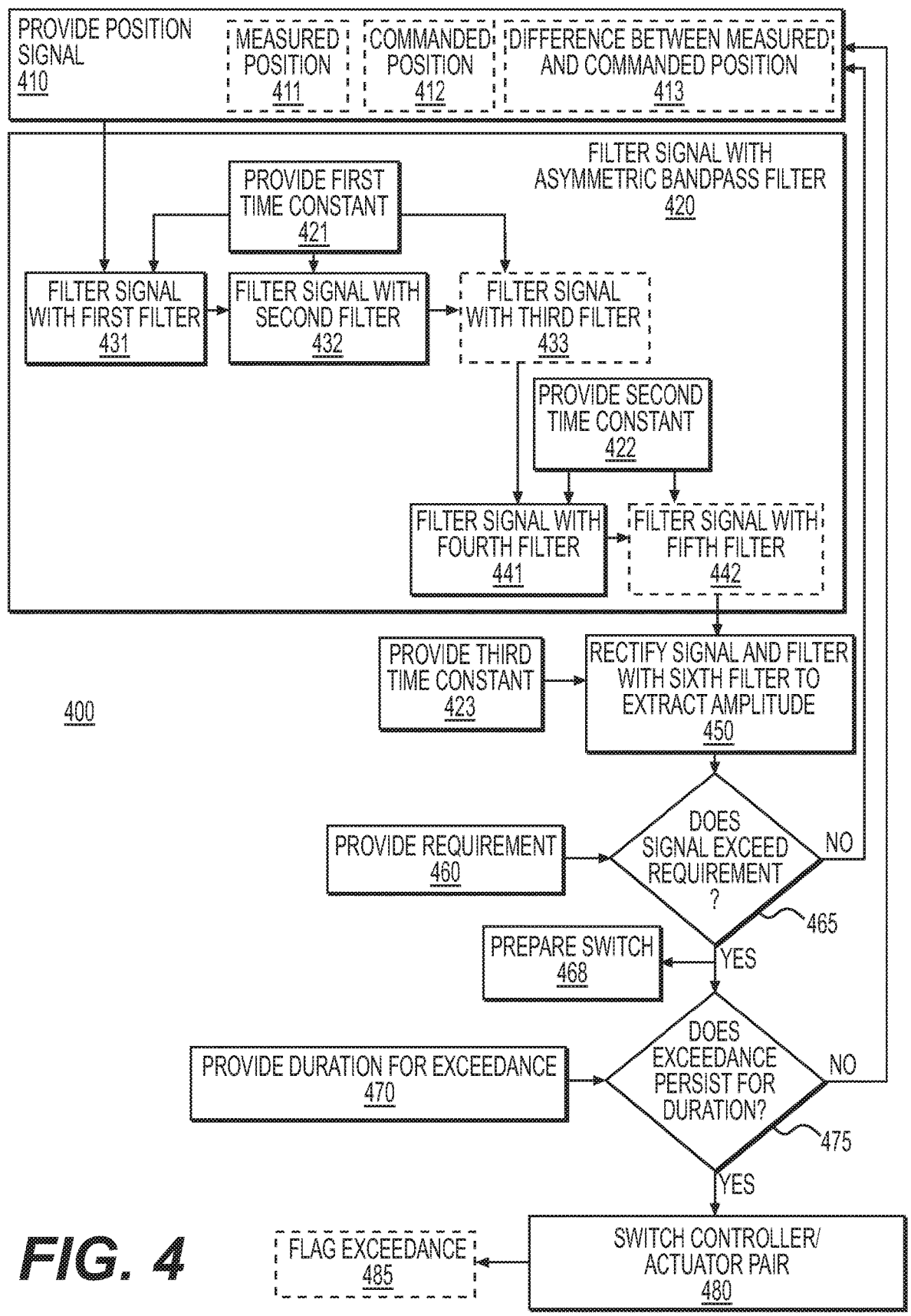
FIG. 4 shows steps of an oscillatory monitoring method, in an embodiment.
Figure 6:
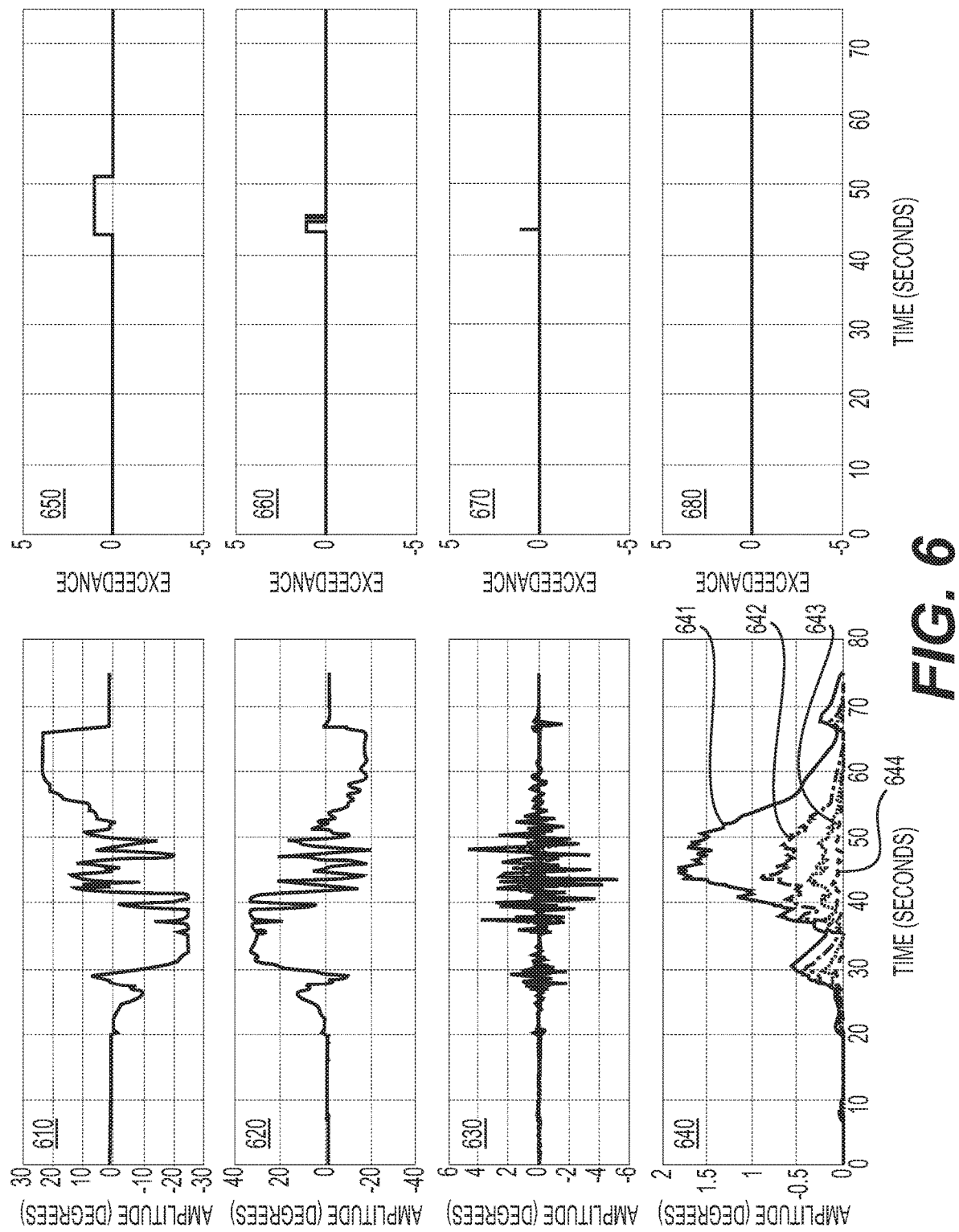
FIG. 6 shows exemplary data generated using the oscillatory monitor method of FIG. 4.

FIG. 4 shows a flow diagram of an exemplary oscillatory monitoring method 400. In a step 410, a position signal is provided. The position signal may include an oscillatory signal having a frequency and an amplitude. Exemplary position signals are shown in FIG. 6 and described below. The position signal may optionally be one of a measured position 411, a commanded position 412, or the difference 413 between the measured position 411 and the commanded position 413.

Measured position 411 is for example a measured position signal that may be provided via first actuator sensor 151, FIG. 1 or control surface sensor 153, FIG. 1. Monitoring measured position enables detection of an oscillation of the actuator driving the control surface, or of an oscillation of control surface 140 itself in the event of a disconnect between the actuator and control surface. In other words, measured position 411 may include two measured position signals, a measured actuator signal from first actuator sensor 151 and a measured surface signal from control surface sensor 153. In the event of higher frequency oscillations (e.g., greater than 4 Hz), which are less likely due to pilot input, measured position 411 may be preferred to monitor oscillations. In this manner, the higher frequency oscillations may be monitored independently from input command 102, enabling an independent method to detect a faulty command causing oscillations, which may be caused by hardware or software errors.

Commanded position 412 may be provided by, for example, input command 102 and command model 110, FIG. 1. Command position 412 may be an expected position of control surface 140 based on input command 102 and command model 110. In certain embodiments, command model 110 determines an expected position of control surface 140 based on a model of the control laws governing system 100 combined with a physics-based model of first actuator 131 and/or control surface 140. Monitoring commanded position 412 enables detection of an unexpected failure in the command path.

The difference 413 between measured position 411 and commanded position 412 may also be monitored for oscillatory failure. A command delay, such as command delay 103, FIG. 1, is optionally added to input command 102 to synchronize commanded position 412 with measured position 411. Command delay 103 is for example a duration equivalent to one or more computational cycles of command model 110. In situations where pilot inputs generate low frequency oscillations (e.g., 0 to 4 Hz), the difference 413 between measured position 411 and commanded position 412 may be used to monitor these oscillations. In certain embodiments, a difference between any pair of oscillatory signals may be determined for monitoring, as further described below in connection with FIG. 7.

In an operation 420, the position signal provided in step 410 is filtered using a bandpass filter. The bandpass filter may be formed by one or more highpass filters in combination with one or more lowpass filters to selectively attenuate low and high frequency content of the signal, respectively, with a middle frequency band passing unfiltered. The highpass filters may include for example washout filters configured to washout low frequency signal content. The bandpass filter may also attenuate or effectively remove signal noise associated with the position signal since the frequency content of the signal noise differs from the unfiltered frequency band of the position signal. Operation 420 may include steps 421, 422, 431, 432, 441, and optional steps 433 and 442, as shown in FIG. 4 and described below.

Figure 5:
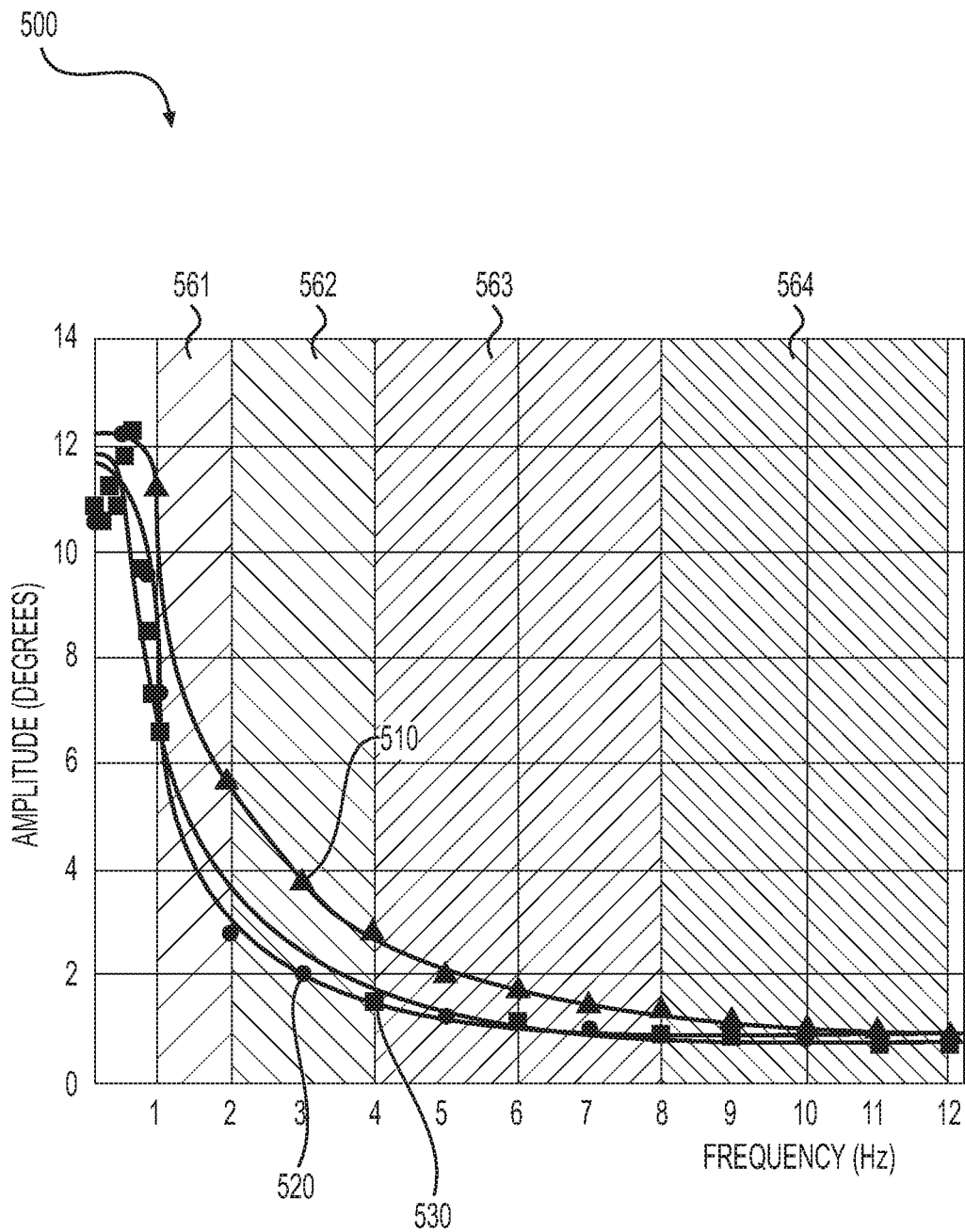
FIG. 5 shows an exemplary plot of position amplitude versus frequency data, in an embodiment.

In certain embodiments, operation 420 filters the position signal using an asymmetric bandpass filter. The asymmetric bandpass filter may be provided by using an unequal number of highpass and lowpass filters. For example, as depicted in FIG. 4, bandpass filter 420 is asymmetric by using two highpass filters aligned in series, in steps 431 and 432, and one lowpass filter in step 441. Alternatively, bandpass filter 420 is asymmetric by using three highpass filters in series, in steps 431, 432, and 433, and two lowpass filters in series, in steps 441 and 442. An asymmetric bandpass filter may be needed when there is a bimodal or asymmetric requirement for amplitude versus frequency. For example, an asymmetric bandpass filter may be needed when large amplitude deflections are permitted at low frequency but only small amplitude deflections are permitted at higher frequencies, as depicted in FIG. 5. An extra highpass filter, for example third filter 433, may be needed to filter large amplitude, low frequency oscillations to prevent false-positive tripping of higher frequency monitors.

In other embodiments, an asymmetric bandpass filter may be provided by using a higher number of lowpass filters compared to highpass filters, such as three lowpass and two highpass filters. Typically, the unequal number of highpass and lowpass filters used to form the asymmetric bandpass filter may include one additional filter. In other words, if there are N number of one type of filter, then typically there are N+1 of the other type of filter.

In a step 421, a first time-constant is provided. The first time-constant is used to determine a low frequency cutoff for each individual monitor 361-372, FIG. 3. The first time-constant may be empirically determined for optimal performance or selected to remove or attenuate frequencies below the desired cutoff frequency.

In a step 431, the position signal is filtered with the first time-constant. In an example of step 431, the position signal of control surface 140 is filtered with a washout filter to attenuate low frequency content based on the first time-constant.

In step 432, the position signal is filtered with a second signal filter using the first time-constant. Step 432 is an example of step 431 for providing additional signal filtering. For example, a single washout filter may not provide sufficient attenuation of low frequency content from the position signal such that a second filter is employed.

In optional step 433, the position signal is filtered with a third signal filter using the first time-constant. Optional step 433 is an example of step 432 and may be employed when additional signal filtering is needed, depending on the amplitude versus frequency signal content. In certain embodiments, three washout filters are used in steps 431, 432, 433 to sufficiently attenuate low frequency content of the position signal.

In a step 422, a second time-constant is provided. In an example of step 422, the second time-constant is smaller than the first time-constant. In another example of step 422, the second time-constant is proportionally smaller than the first time-constant based on a desired number of individual monitors (e.g., monitors 361-372, FIG. 3) that are employed in oscillatory monitor 160. The second time-constant is used to determine a high frequency cutoff for each individual monitor 361-372, FIG. 3. The second time-constant may be empirically determined for optimal performance or selected to attenuate frequencies above the desired cutoff frequency.

In a step 441, the position signal is filtered with a fourth signal filter using the second time-constant. In an example of step 441, the position signal of control surface 140 is filtered with for example a lowpass filter to attenuate high frequency content based on the second time-constant.

In an optional step 442, the position signal is filtered with a fifth signal filter using the second time-constant. Optional step 442 is an example of step 441 and may be employed when additional signal filtering is needed. For example, a single lowpass filter may not provide sufficient attenuation of high frequency content from the position signal such that a second filter may optionally be employed.

In a step 423, a third time-constant is provided. In an example of step 423, the third time-constant is selected to match the dominant frequency remaining in the filtered position signal. In another example of step 422, the third time-constant is about fifteen times the first time-constant provided in step 421. The third time-constant may be empirically determined for optimal performance or predetermined to rectify the filtered position signal.

In a step 450, the filtered position signal is rectified using the third time-constant to extract the amplitude of the position signal. An exemplary plot of the filtered position signal is shown in FIG. 6 and described below. In an example of step 450, the filtered signal from control surface 140 is rectified and the amplitude of the signal is extracted by observing the output of a lowpass filter, such as fourth filter 441, over time. An exemplary plot of the rectified signal is shown in FIG. 6 and described below. In another example of step 450, amplitude values are measured using a moving window in time from the filtered signal of control surface 140 and the root-mean-square (RMS) amplitude is calculated. Alternatively, the peak-to-peak amplitude values are observed and divided by two to extract the amplitude.

In a step 460, an amplitude requirement for the control surface is provided. In an example of step 460, the amplitude requirement provided is a predetermined amplitude or range of amplitudes as a function of frequency for control surface 140. The amplitude requirement may for example be an array of amplitude values as a function of frequencies and may be expressed in degrees of deflection per Hz or as a fraction of the full operating range of control surface 140 per Hz. The amplitude requirement may be based on empirical or modeled data, such as from command model 110 for example, and may include a factor of safety. FIG. 5, described below, shows an exemplary amplitude requirement curve of control surface deflection in degrees, plotted as a function of oscillation frequency in Hz.

In certain embodiments, the amplitude requirement depends on airspeed such that deviation from nominal position is more limited at higher airspeeds. At higher airspeeds, aerodynamic load on control surfaces increases, thus increasing the need to limit movement of the control surface. While taxiing for example, a rudder angle may be limited to thirty-three degrees from nominal, whereas during high-speed portions of flight the rudder angle may be limited to only one degree from nominal. Oscillatory frequency of control surface 140 may also correlate with airspeed, such that higher frequencies, which correspond with higher airspeeds, have smaller amplitude requirements.

A step 465 is a decision. If in step 465, the amplitude from step 450 exceeds the amplitude requirement from step 460, method 400 proceeds to steps 468 and 475. Otherwise, method 400 returns to step 410, at which time method 400 may be repeated. In an example of step 465, the amplitude extracted from the filtered position signal of control surface sensor 153 exceeds the amplitude requirement by an exceedance, which is provided to steps 468 and 475, described below.

In a step 468, a controller/actuator switch is prepared. In an example of step 468, switch 105, FIG. 1 is prepared for switching from a first controller/actuator pair (e.g., first controller 121 and first actuator 131) to a second controller/actuator pair (e.g., second controller 122 and second actuator 132). The preparation provides a delay prior to switching to enable second controller/actuator pair adequate time to establish control over control surface 140 and ensure a smooth transition between controller/actuator pairs.

In a step 470, a duration for the exceedance is provided. In an example of step 470, a duration is provided for monitoring the exceedance from step 465 to determine if the exceedance persists. The length of the duration is customized to avoid false positive trips of the monitor due to short duration signal spikes, which may be caused by normal pilot input to the control surface. Exemplary durations include about 0.1 second, about 5 seconds, about 10 seconds, about 30 seconds, or about 60 seconds. The duration may be customized for each individual monitor. For example, a longer duration may be provided for a low frequency monitor, while a shorter duration may be provided for a high frequency monitor.

A step 475 is another decision. If in step 475 the exceedance from step 465 persists for the duration provided in step 470, method 400 proceeds to step 480. Otherwise, method 400 returns to step 410, at which time method 400 may be repeated.

In a step 480, the controller/actuator pair is switched. In an example of step 480, switch 105 changes control of control surface 140 from first controller 121 and first actuator 131 to second controller 122 and second actuator 132.

In an optional step 485, the exceedance is flagged. In an example of step 485, a flag is set in software 255, FIG. 2 and may be reported, via interface 256 for example, that a known faulty condition exists.

FIG. 5 shows an exemplary plot 500 of position amplitude in degrees versus oscillatory frequency in Hz. A requirement curve 510 delineates an exemplary upper limit for permissible position amplitudes at 1 Hz intervals over a frequency range of 1-12 Hz. For example, the amplitude requirement is about 11 degrees at 1 Hz, drops to about 2 degrees at 5 Hz, and further drops to less than 1 degree at 12 Hz. The requirement curve may be determined empirically or by modeling and may include a factor of safety.

FIG. 5 illustrates exemplary amplitude versus frequency values 520 for control surface 140. The amplitude values may be measured, via control surface sensor 153 for example, or modeled via command model 110 for example, and filtered using method 400, FIG. 4. Amplitude values 520 were determined using four individual monitors (e.g., first, second, third, and fourth oscillatory monitors, 361-364, FIG. 3) corresponding with four signal frequency bands used to filter position amplitude signals; namely, a first frequency band 561 has a range of 1-2 Hz, a second frequency band 562 has a range of 2-4 Hz, a third frequency band 563 has a range of 4-8 Hz, and a fourth frequency band 564 has a range of 8-12 Hz, as shown in FIG. 5.

Similarly, FIG. 5 also illustrates exemplary amplitude versus frequency values 530 for first actuator 131 measured via first actuator sensor 151, or modeled via command model 110. Amplitude values 530 may also be filtered using method 400, FIG. 4 with four individual monitors, such as first, second, third, and fourth oscillatory monitors, 361-364, FIG. 3, corresponding with first, second, third, and fourth frequency bands 561-564, respectively. Note that the plotted curves of amplitude values 520 (corresponding to control surface 140) are similar to the plotted curves of amplitude values 530 (corresponding to first actuator 131), as expected. Also, as expected, both amplitude values 520 and amplitude values 530 are lower than requirement curve 510.

FIG. 6 shows exemplary data generated using oscillatory monitor method 400, FIG. 4. In plot 610, a commanded position signal is plotted over time. The commanded position signal is the position signal of first actuator 131, for example. In plot 620, a control surface position signal, such as the position signal of control surface 140, is plotted over time. Note that the amplitude of the commanded position signal in plot 610 roughly matches the control surface position signal in plot 620, except with the opposite sign, as expected (e.g., a pilot command to the right causes a rudder deflection to the left and vice-versa).

Plot 630 shows a control surface position signal following filtering using first, second, third, and fourth monitors 361-364, FIG. 3, respectively. Each monitor 361-364 filters a different portion of the frequency content of the position signal using an asymmetric bandpass filter, such as in step 420, FIG. 4, and the different portions of the frequency are combined in plot 630 (e.g., overlapping one another).

Plot 640 shows four rectified control surface position signals following step 450, FIG. 4, which rectifies the signal to extract amplitudes. Specifically, line 641 shows the first rectified position signal from first monitor 361; line 642 shows the second rectified position signal from second monitor 362; line 643 shows the third rectified position signal from third monitor 363; and, line 644 shows the fourth rectified position signal from fourth monitor 364.

Plots 650, 660, 670, and 680 are binary plots illustrating periods of exceedance (e.g., represented by a value of one on the y-axis) following step 465, FIG. 4 from first, second, third, and fourth monitors 361-364, respectively. Specifically, plot 650 is a first exceedance plot showing an exceedance of first monitor 361 over time; plot 660 is a second exceedance plot showing an exceedance of second monitor 362 over time; plot 670 is a third exceedance plot showing an exceedance of third monitor 363 over time; and, plot 680 is a fourth exceedance plot without an exceedance over time corresponding to fourth monitor 364. Plots 650, 660, and 670 show exceedances of different durations along the x-axis (in seconds). Plot 680 shows no exceedances (e.g., the value remains zero on the y-axis). Step 475, FIG. 4 determines whether each exceedance persists beyond a predetermined duration before initiating corrective action. The predetermined durations may differ between different monitors.

In certain embodiments, differences between any two oscillatory signals may be determined for monitoring. One example of determining a difference between two signals for monitoring is step 413 of FIG. 4, which determines a difference between measured position signal 411 and commanded position signal 412. More generally, steps 420 to 485 may be used to detect whether one signal is oscillating relative to another signal.

Figure 7:
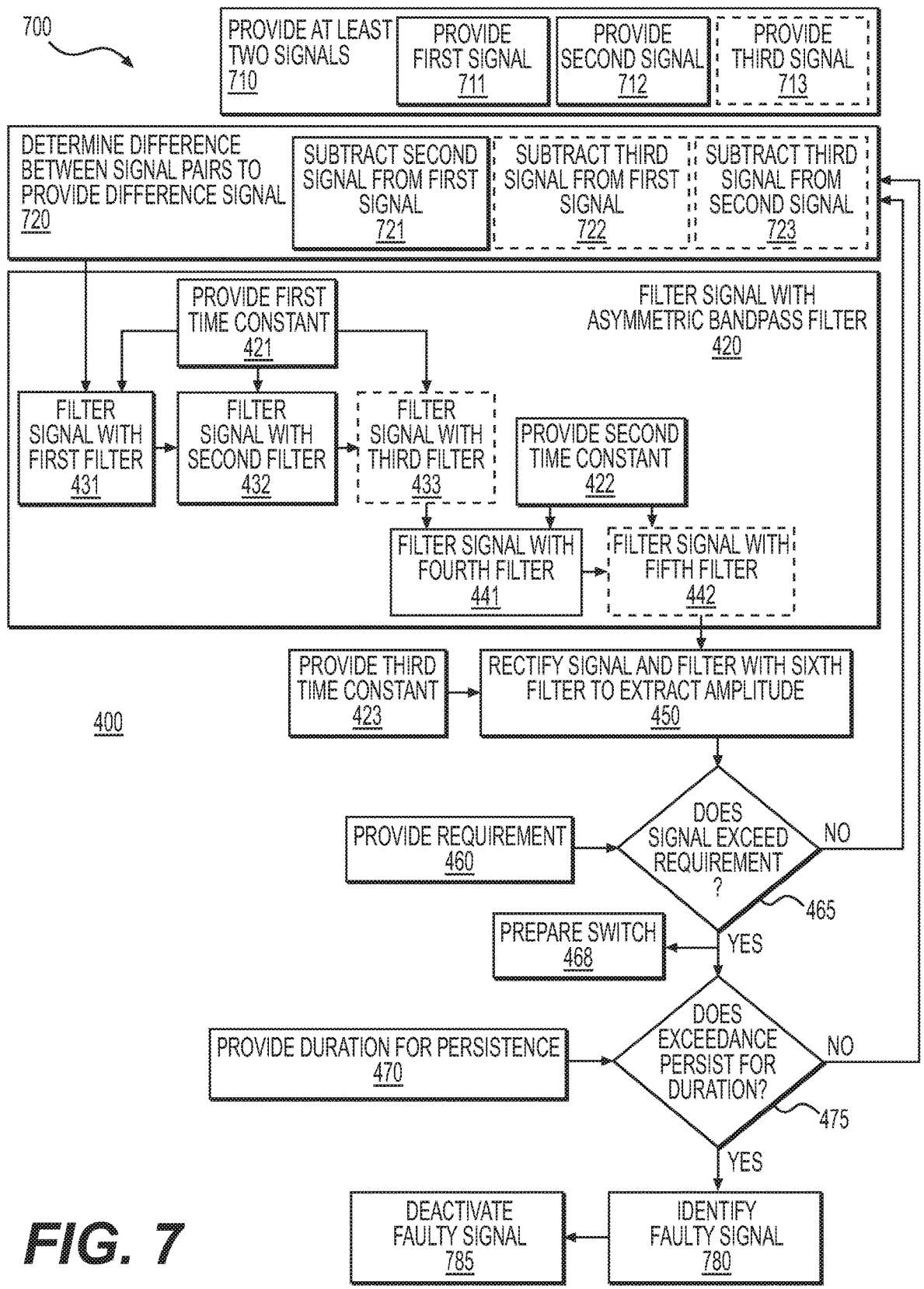
FIG. 7 shows steps of another oscillatory monitoring method, in an embodiment.

FIG. 7 shows steps for an oscillatory monitor method 700, which is an example of method 400, FIG. 4. Steps 421 through 475 are the same as in method 400, FIG. 4; accordingly, their description is not repeated.

In a step 710, a least two signals are provided. For example, in a step 711 a first signal is provided and in a step 712 a second signal is provided. Optionally, a third signal 713 is also provided. First, second, and third signals 711, 712, 713 are exemplary and in no way limiting to the number of signals that may be provided in step 710, but only three signals are shown in FIG. 7 for clarity of illustration. In other words, more than three signals may be provided in step 710 without departing from the scope hereof.

In an example of step 710, step 711 provides a measured position signal of control surface 140, FIG. 1, step 712 provides a measured position signal of first actuator 131, FIG. 1, and step 713 provides a commanded position signal (e.g., commanded position 412, FIG. 4). All three of these signals are nominally expected to oscillate in synchrony with one another, and method 700 monitors pairwise signal differences for detecting unintended deflections.

In a step 720, a difference is determined between signal pairs to provide one or more difference signals. For example, in a step 721 the second signal from step 712 is subtracted from the first signal from step 711. Optionally, in a step 722 the third signal from step 713 is subtracted from the first signal, and in a step 723 the third signal is subtracted from the second signal. Each of the resulting difference signals is provided to step 420 for filtering, as described above in connection with FIG. 4, except that the time-constants may be configured specific to certain difference signals.

Following steps 423 to 475, described above in connection with FIG. 4, if the amplitude of the filtered signal difference exceeds a predetermined amplitude requirement as determined in step 465, and if an exceedance of the predetermined amplitude requirement persists for a predetermined duration in step 475, then method 700 proceeds to a step 780.

In step 780, a faulty oscillatory signal is identified. In an example of step 780, the first signal provided in step 711 is identified as faulty. In certain embodiments, a faulty signal is identified when one controller (e.g., first controller 121, FIG. 1) receives a degraded signal due to an oscillatory signal failure. The oscillatory signal failure may result from one or more sensor failures or one or more hardware failures, which in turn may result from an uncommanded or unexpected surface response, for example.

In certain embodiments, oscillatory monitor 160 compares a measure of signal quality from first controller 121 with a measure of signal quality from second controller 122. The measure of signal quality may be determined based on potential failure modes of the controller. The possible failure modes may include signal losses, but may also be aggregated from functions that are no longer supported by the controller, based on either signal or other failures. In certain embodiments, the measure of signal quality is a sum of the failures affecting a particular controller.

In a step 785, an identified faulty oscillatory signal is deactivated from use in the controller. In an example of step 785, a faulty oscillatory signal identified in step 780 of first controller 121 is deactivated. When a controller with a lower signal quality is deactivated (e.g., first controller 121), a redundant controller (e.g., second controller 122) with a higher signal quality is activated. In other words, control of control surface 140 is switched via switch 105 from first controller 121 to second controller 122 (similar to step 480, FIG. 4).

If a source of the signal is faulty, the faulty signal is deactivated. A redundant source signal may be activated instead. In certain embodiments, signals monitored for oscillatory failures are provided in triplicate, such that a single faulty signal may be removed. If two of the signals are faulty, all three triplicate signals are removed and the functions that require that signal are disabled. Other signal redundancy combinations may include dual signals from a sensor of the same type, plus two additional signal sources from two different types of sensors. This combination results in four sources, with three being dissimilar. In other embodiments, only duplicate signals are provided and both signals are deactivated after a single failure.

In certain embodiments, method 700 may be used to detect and remove faulty signals from sensors, including but not limited to sensors of pilot-input (e.g., pedal, yoke or side-stick position sensors), inertial yaw rate, and roll rate (e.g., accelerometers). At least two sensor signals may be provided in step 710, and differences between signal pairs may be determined in step 720. Using appropriate time-constants for signal filtering (e.g., in step 420), sensor signal differences may be used to determine which sensor signal includes an oscillatory failure. For example, for a group of four pedal position sensors S1, S2, S3, and S4, a difference between each pair of signals is determined to provide six difference signals D1, D2, D3, D4, D5, and D6 (e.g., D1=S1−S2; D2=S1−S3; D3=S1−S4; D4=S2−S3; D5=S2−S4; D6=S3−S4). If one sensor, for example S1, produces an oscillatory failure, difference signals based on S1 (e.g., D1, D2, and D3) may each trip an oscillatory monitor. In another example, if S2 is faulty, difference signals D1, D4, and D5 may each trip an oscillatory monitor, and so on for other sensor signals.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A method for monitoring an oscillatory signal, comprising:
providing an oscillatory signal from an oscillating device, wherein the oscillatory signal is a measured position signal of the oscillating device;
filtering the oscillatory signal to within a desired frequency band to provide a filtered signal;
extracting an amplitude from the filtered signal;
determining whether the amplitude exceeds a predetermined amplitude requirement for a predetermined duration; and
switching control of the oscillating device from a first controller to a second controller when the amplitude exceeds the predetermined amplitude requirement for the predetermined duration.

2. The method of claim 1, wherein the step of providing the oscillatory signal further comprises:
providing a commanded position signal; and
determining a difference between the measured position signal and the commanded position signal.

3. The method of claim 1, wherein the step of filtering the oscillatory signal comprises filtering the oscillatory signal using an asymmetric bandpass filter.

4. The method of claim 3, wherein the asymmetric bandpass filter includes at least two signal filters having a first time-constant for determining a low frequency cutoff, and at least one signal filter having a second time-constant that is smaller than the first time-constant for determining a high frequency cutoff.

5. The method of claim 1, wherein the step of extracting the amplitude from the filtered signal comprises rectifying the filtered signal and observing the output from a lowpass filter using a third time-constant.

6. The method of claim 1, wherein the predetermined duration is customized to avoid false positive trips due to short duration signal spikes.

7. The method of claim 1, further comprising, prior to the step of switching, preparing the second controller for switching by providing a delay for enabling the second controller time to establish control of the oscillating device to ensure a smooth transition from the first controller.

8. The method of claim 1, further comprising:
filtering the oscillatory signal into a plurality of frequency bands using a respective plurality of asymmetric bandpass filters;
extracting an amplitude from each of the plurality of frequency bands to provide a plurality of amplitudes;
determining whether each of the plurality of amplitudes exceeds a respective predetermined amplitude requirement for a respective predetermined duration; and
switching control of the oscillating device from the first controller to the second controller when at least one of the plurality of amplitudes exceeds its respective predetermined amplitude requirement for its respective predetermined duration.

9. An oscillatory signal monitor, comprising:
a first controller and a second controller each configured to independently provide control of an oscillating device;
an oscillatory signal based on a measured position of the oscillating device, wherein the oscillating device is a control surface, and the measured position is determined using a sensor configured to monitor a position of the control surface;
a processor for processing software stored in non-transitory memory, the software
providing instructions for performing the steps of:
filtering the oscillatory signal to a desired frequency band to provide a filtered signal;
extracting an amplitude from the filtered signal;
determining whether the amplitude exceeds a predetermined amplitude requirement for a predetermined duration; and
a switch for switching control of the oscillatory device from the first controller to the second controller when the amplitude exceeds the predetermined amplitude requirement for the predetermined duration.

10. The oscillatory monitor of claim 9, wherein the oscillatory signal is an error signal determined from a difference between a commanded signal and one of a measured surface signal or a measured actuator signal, wherein the commanded signal is based on an input command and a physics-based control model of the actuator and the control surface.

11. The oscillatory monitor of claim 9, wherein filtering the oscillatory signal is performed using an asymmetric bandpass filter comprising at least two signal filters arranged in series having a first time-constant for determining a low frequency cutoff, and at least one signal filter having a second time-constant that is smaller than the first time-constant for determining a high frequency cutoff.

12. The oscillatory monitor of claim 9, wherein the predetermined amplitude requirement is based on an airspeed of an aircraft due to aerodynamic forces on an aircraft control surface.

13. The oscillatory monitor of claim 9, wherein the predetermined duration is customized to avoid false positive trips due to short duration signal spikes.

14. The oscillatory monitor of claim 9, wherein the oscillating device is an aircraft control surface selected from the group consisting of aileron, elevator, horizontal stabilizer, flap, slat, spoiler, and rudder.

15. An oscillatory signal monitor, comprising:
a first controller and a second controller each configured to independently provide control of an oscillating device;
an oscillatory signal based on a measured position of the oscillating device;
an actuator configured to drive movement of a control surface, wherein the oscillatory signal is a measured signal based on an actuator sensor configured to monitor a position of the actuator;
a processor for processing software stored in non-transitory memory, the software
  providing instructions for performing the steps of:
  filtering the oscillatory signal to a desired frequency band to provide a filtered signal;
  extracting an amplitude from the filtered signal;
  determining whether the amplitude exceeds a predetermined amplitude requirement for a predetermined duration; and
a switch for switching control of the oscillatory device from the first controller to the second controller when the amplitude exceeds the predetermined amplitude requirement for the predetermined duration.

* * * * *